(12) United States Patent
Tsai et al.

(10) Patent No.: US 11,914,818 B2
(45) Date of Patent: Feb. 27, 2024

(54) ELECTRONIC DEVICE AND OPERATION CONTROL METHOD WITH SWITCH FUNCTION OF TOUCHABLE REGION

(71) Applicant: ASUSTeK COMPUTER INC., Taipei (TW)

(72) Inventors: Yao-Yu Tsai, Taipei (TW); Chun-Tsai Yeh, Taipei (TW); Ya-Ting Chen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/844,956

(22) Filed: Jun. 21, 2022

(65) Prior Publication Data

US 2023/0011325 A1    Jan. 12, 2023

(30) Foreign Application Priority Data

Jul. 9, 2021  (TW) ................................ 110125407

(51) Int. Cl.
*G06F 3/041* (2006.01)
*G06F 3/01* (2006.01)
*G06F 3/0354* (2013.01)

(52) U.S. Cl.
CPC .......... *G06F 3/04186* (2019.05); *G06F 3/017* (2013.01); *G06F 3/03547* (2013.01); *G06F 2203/04104* (2013.01); *G06F 2203/04108* (2013.01)

(58) Field of Classification Search
CPC .. G06F 3/04186; G06F 3/017; G06F 3/03547; G06F 2203/04104; G06F 2203/04108
See application file for complete search history.

(56) References Cited

U.S. PATENT DOCUMENTS

| 2015/0186030 | A1* | 7/2015 | Yoo | G06F 1/163 715/857 |
| 2019/0060767 | A1* | 2/2019 | Shao | A63F 13/426 |

FOREIGN PATENT DOCUMENTS

| CN | 102096490 A | 6/2011 |
| CN | 104635985 B | 2/2017 |
| CN | 104182155 B | 11/2017 |
| CN | 108845617 A | 11/2018 |

* cited by examiner

*Primary Examiner* — Afroza Chowdhury
(74) *Attorney, Agent, or Firm* — McClure, Qualey & Rodack, LLP

(57) ABSTRACT

An electrical device and an operation control method are provided. The electronic device includes a touch module and a processor. The touch module includes a touchable region. The touchable region is divided into at least a first touchable region and a second touchable region. The first touchable region is configured to implement a first function. The second touchable region is configured to implement the first function and a second function. The processor is electrically connected to the touch module. When at least one first touch point is detected in the first touchable region, at least one second touch point is detected in the second touchable region, and the processor determines that a distance between the first touch point and the second touch point is within a predetermined distance, the second touchable region is switched to implementing the first function.

20 Claims, 11 Drawing Sheets

ELECTRONIC DEVICE AND OPERATION CONTROL METHOD WITH SWITCH FUNCTION OF TOUCHABLE REGION

CROSS-REFERENCE TO RELATED APPLICATION

This application claims the priority benefit of Taiwan Application Serial No. 110125407, filed on Jul. 9, 2021. The entirety of the above-mentioned patent application is hereby incorporated by reference herein and made a part of the specification.

BACKGROUND OF THE INVENTION

Field of the Invention

The disclosure relates to an electronic device and an operation control method applicable to an electronic device.

Description of the Related Art

As notebook computers become increasingly popular and lightweight, fixed operating space of existing touchpads is increasingly unable to meet needs of users. Therefore, large-size touchpads will become a trend in new generation. For an ultra-large touch module, to meet multiple use scenarios, more input modes need to be combined with original touch modes.

Conventional touch algorithms are based on that a touchpad includes only a single touch region. When the touchpad includes a first touchable region implementing a first function and a second touchable region implementing the first function and a second function, the first touchable region having only the first function makes a user prefer experience of the first function. Therefore, when determining, according to finger touch points on the first touchable region and the second touchable region, whether the second touchable region needs to be switched to implementing the first function or the second function, a system also tends to switch to the first function. In a scenario in which the user performs operations with both hands, if the system determines that the second touchable region is switched to implementing the first function, the user cannot use the second function with the other hand at the same time.

BRIEF SUMMARY OF THE INVENTION

According to the first aspect, an electronic device is provided. The electronic device includes a touch module and a processor. The touch module includes a touchable region. The touchable region is divided into at least a first touchable region and a second touchable region. The first touchable region is configured to implement a first function. The second touchable region is configured to implement the first function and a second function. The processor is electrically connected to the touch module. When at least one first touch point is detected in the first touchable region, at least one second touch point is detected in the second touchable region, and the processor determines that a distance between the first touch point and the second touch point is within a first predetermined distance, the second touchable region is switched to implementing the first function.

According to the second aspect, an operation control method applied to a touch module of an electronic device is provided. The touch module includes a touchable region. The touchable region is divided into at least a first touchable region and a second touchable region. The first touchable region is configured to implement a first function. The second touchable region is configured to implement the first function and a second function. The operation control method includes: detecting at least one first touch point in the first touchable region; detecting at least one second touch point in the second touchable region; and switching the second touchable region to the first function when it is determined that a distance between the first touch point and the second touch point is within a first predetermined distance.

In conclusion, the disclosure provides an electronic device and an operation control method, to improve user experience of a combined touch module, and provide a mode for determining a gesture of a user, to allow a user to smoothly control and use a first function (such as a touchpad function) or/and a second function (such as a keyboard function) on an ultra-large touch module.

DETAILED DESCRIPTION OF THE EMBODIMENTS

Embodiments of the disclosure are described below with reference to related accompanying drawings. In the accompanying drawings, the same reference numbers represent the same or similar element or circuits. It should be understood that although terms such as "first" and "second" in the disclosure are used for describing various elements, components, regions, and functions, the elements, components, regions, and/or functions should not be limited by such terms. The terms are merely used for distinguishing one element, component, region, or function from another element, component, region, or function.

Figure 1:
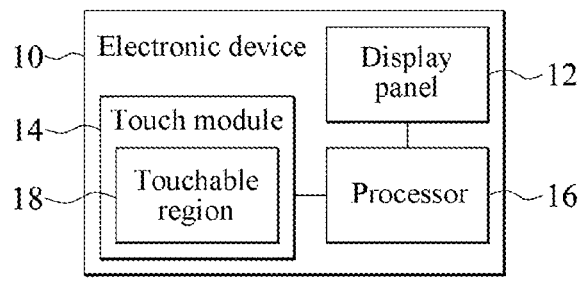
FIG. 1 is a schematic block diagram of an electronic device according to an embodiment of the disclosure.
Figure 2:
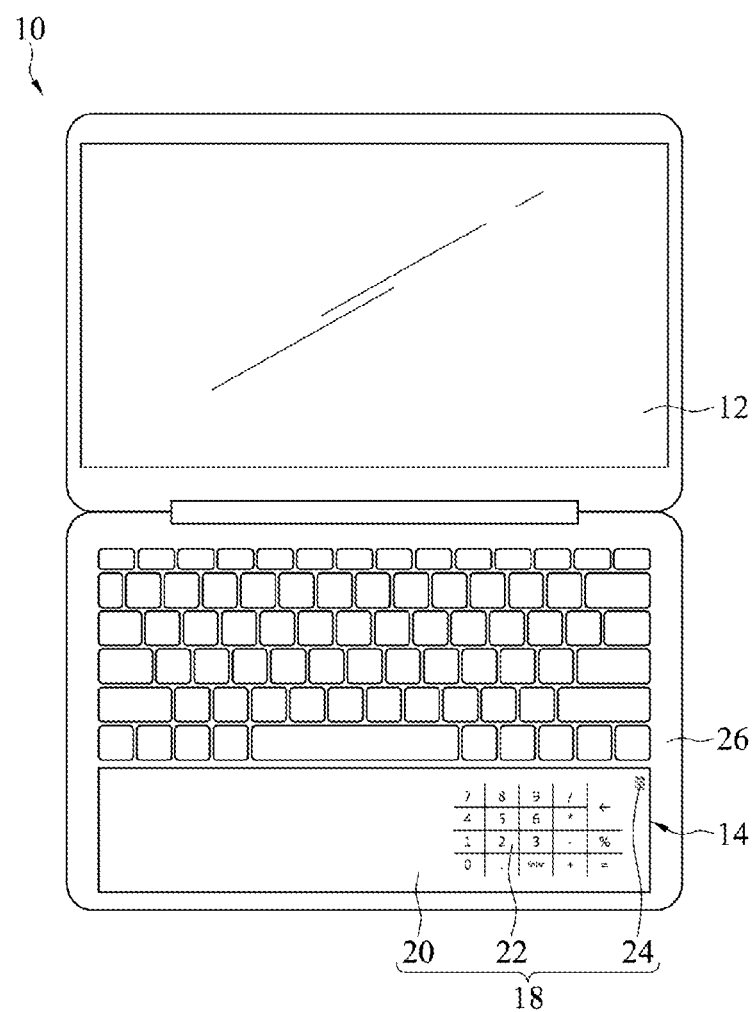
FIG. 2 is a schematic outside view of an electronic device according to an embodiment of the disclosure.

Referring to FIG. 1 and FIG. 2, an electronic device 10 includes a display panel 12, a touch module 14, and a processor 16. The processor 16 is electrically connected to the display panel 12 and the touch module 14. The touch module 14 is a touchpad and includes a touchable region 18. The touchable region 18 is divided into at least a first touchable region 20 and a second touchable region 22. The first touchable region 20 is configured to implement a first function. The second touchable region 22 is configured to implement the first function and a second function. The processor 16 includes a plurality of software elements, respectively implementing the first function and the second function. In an embodiment, the first function is a touchpad function, and the second function is a keyboard function. In an example, the keyboard function is a numeric keypad function. The software elements are a touchpad driver and a keyboard driver, to respectively implement the touchpad function as the first function and the keyboard function as the second function. The software elements in the processor 16 further include a touch algorithm. The touch algorithm is responsible for determining a touch behavior of a user, to determine that the second touchable region 22 implements the first function or the second function.

In an embodiment, the touchable region 18 is further divided into the first touchable region 20, the second touchable region 22, and a third touchable region 24 located in a corner. The third touchable region 24 is configured to enable or disable the second function of the second touchable region 22. When the second function of the second touchable region 22 is disabled, the first touchable region 20 and the second touchable region 22 both implement the first function.

In an embodiment, the electronic device 10 is a notebook computer. In an embodiment, the processor 16 is, but is not limited to, a central processing unit (CPU), a microprocessor, a digital signal processor (DSP), an application-specific integrated circuit (ASIC), a system on a chip (SOC) or other similar elements or a combination thereof.

Figure 3A:
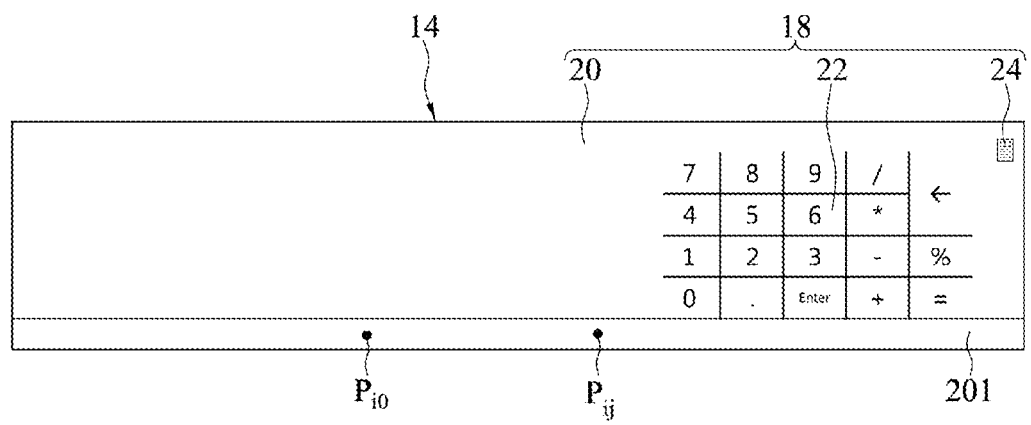
FIG. 3A is a schematic diagram of a lower edge region of a touchable region of a touch module according to an embodiment of the disclosure.
Figure 3B:
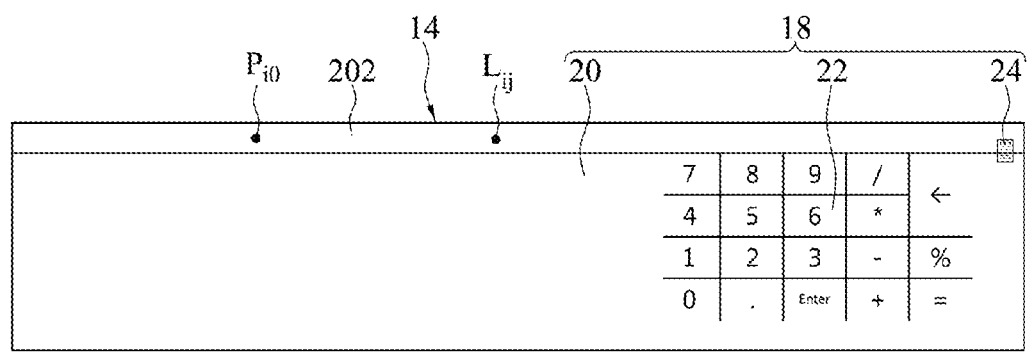
FIG. 3B is a schematic diagram of an upper edge region of a touchable region of a touch module according to an embodiment of the disclosure.

Referring to FIG. 3A and FIG. 3B, the first touchable region 20 further includes a lower edge region 201 located on a lower edge and an upper edge region 202 located on an upper edge. Referring to FIG. 1, FIG. 2, and FIG. 3A together, due to a size of the ultra-large touch module 14 and configuration of a base 26 (commonly known as a C part) located on the electronic device 10, when performing operations, a user leans a small area of a palm on the touch module 14. When the touch module 14 detects a finger signal, a starting touch point $P_{i0}$ is located in the lower edge region 201, a current-frame touch point $P_{ij}$ is also located in the lower edge region 201, and a distance between the starting touch point $P_{i0}$ and the current-frame touch point $P_{ij}$ is less than or equal to a predetermined distance threshold $Th_A$, $(a|P_{ij}(x)-P_{i0}(x)|^k+b|P_{ij}(y)-P_{i0}(y)|^k)^{1/k} \leq Th_A$, where a and b are non-negative floating-point numbers, and k is greater than 0, the processor 16 determines that the current-frame touch point $P_{ij}$ is an untrusted touch point, indicating that there is only a single touch point in this case, and a single-finger trigger is not caused. When the distance between the starting touch point $P_{i0}$ and the current-frame touch point $P_{ij}$ is greater than the predetermined distance threshold $Th_A$ $((a|P_{ij}(x)-P_{i0}(x)|^k+b|P_{ij}(y)-P_{i0}(y)|^k)^{1/k} \leq Th_A$, where a and b are non-negative floating-point numbers, and k is greater than 0), that is, when the current-frame touch point $P_{ij}$ is released to be a trusted touch point, a move operation on the current-frame touch point $P_{ij}$ triggers gesture control.

Referring to FIG. 1, FIG. 2, and FIG. 3B together, when a user performs a combined operation of typing with a keyboard and performing an operation with the touch module 14, there is a palm touch point $L_{ij}$, a distance between the current-frame touch point $P_{ij}$ and the palm touch point $L_{ij}$ is less than or equal to a predetermined distance threshold $Th_B$, that is, $(a|P_{ij}(x)-L_{ij}(x)|^k+b|P_{ij}(y)-P_{ij}(y)|^k)^{1/k} \leq Th_B$, where a and b are non-negative floating-point numbers, and k is greater than 0, and in addition, the current-frame touch point $P_{ij}$ and the palm touch point $L_{ij}$ are both located in the upper edge region 202, the processor 16 determines that the current-frame touch point $P_{ij}$ is an untrusted touch point. In this case, the point is regarded as a palm mis-touch and excluded. When the distance between the current-frame touch point $P_{ij}$ and the palm touch point $L_{ij}$ is greater than the predetermined distance threshold $Th_B$ $((a|P_{ij}(x)-L_{ij}(x)|^k+b|P_{ij}(y)-P_{ij}(y)|^k)^{1/k} \leq Th_B$, where a and b are non-negative floating-point numbers, and k is greater than 0), the current-frame touch point $P_{ij}$ is released to be a trusted touch point. At this point, a move operation on the current-frame touch point $P_{ij}$ triggers gesture control. Therefore, design of the lower edge region 201 at a bottom portion of FIG. 3A and the upper edge region 202 at a top portion of FIG. 3B is an anti-palm touch mechanism.

Figure 4:
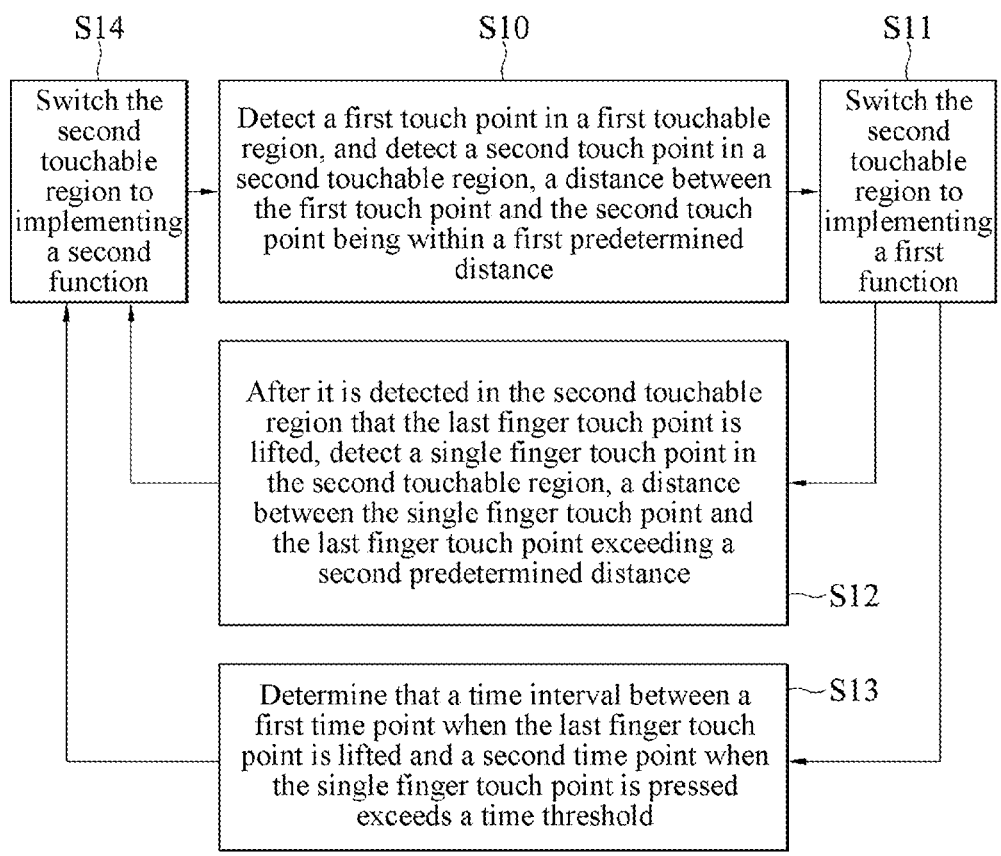
FIG. 4 is a schematic flowchart of an operation control method according to an embodiment of the disclosure.
Figure 5A:
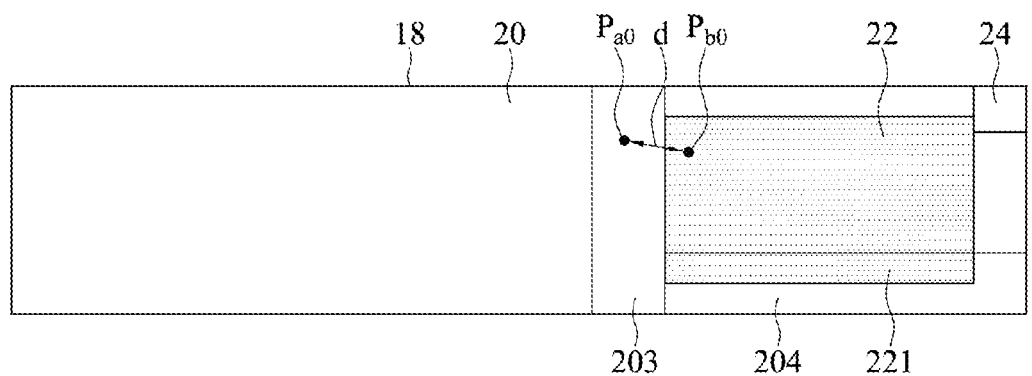
FIG. 5A is a schematic diagram of a touchable region of a touch module according to an embodiment of the disclosure, where a second touchable region is implementing a second function.
Figure 5B:
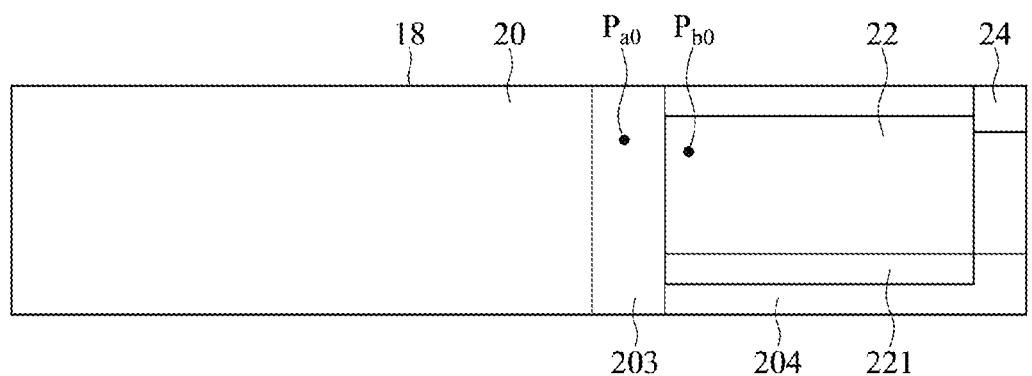
FIG. 5B is a schematic diagram of a touchable region of a touch module according to another embodiment of the disclosure, where a second touchable region is switched to implementing a first function.
Figure 6:
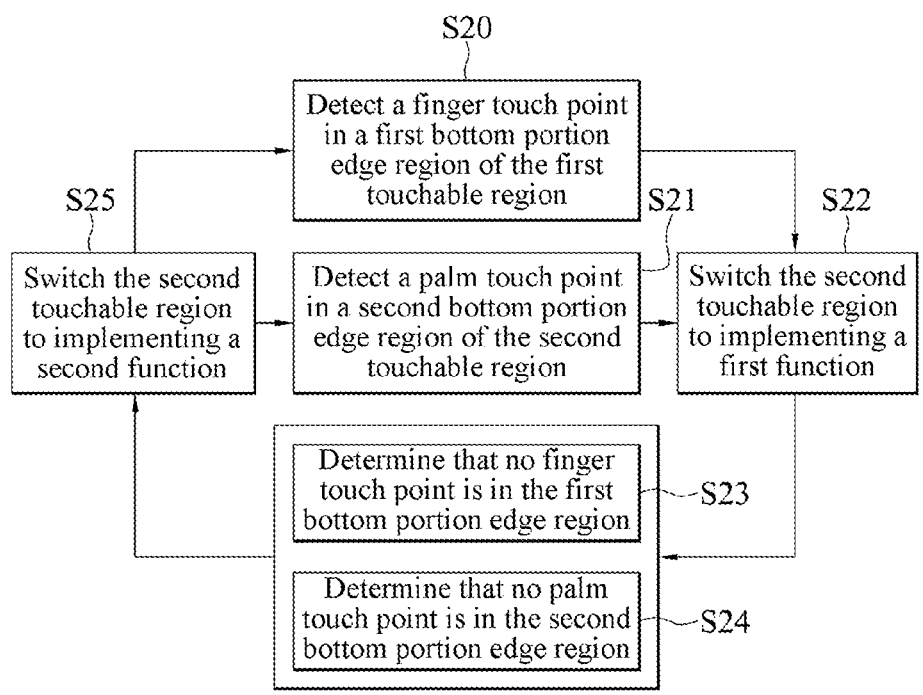
FIG. 6 is a schematic flowchart of an operation control method according to another embodiment of the disclosure.
Figure 7A:
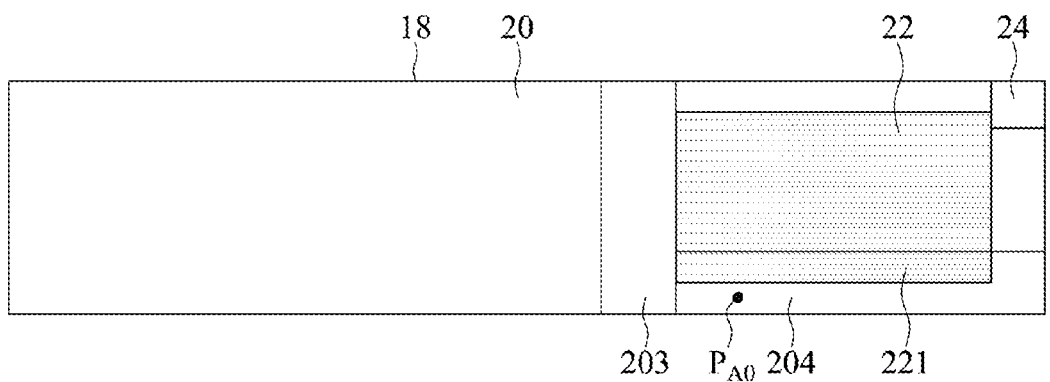
FIG. 7A is a schematic diagram of a touchable region having a finger touch point according to an embodiment of the disclosure, where a second touchable region is implementing a second function.
Figure 7B:
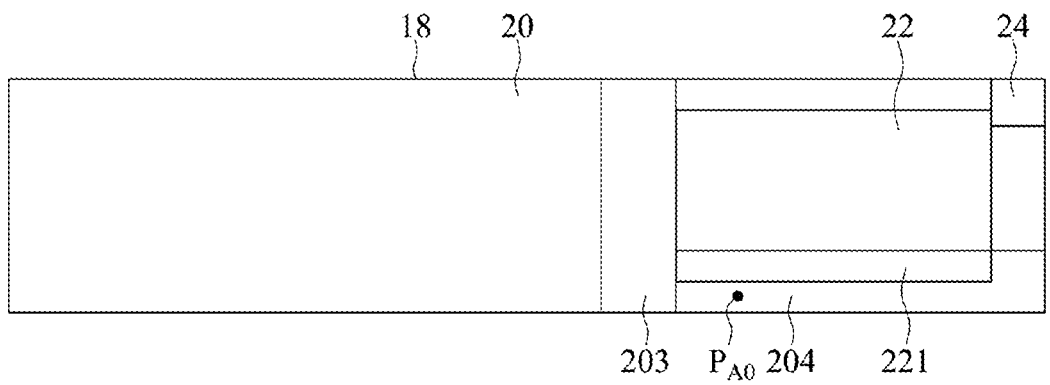
FIG. 7B is a schematic diagram of a touchable region having a finger touch point according to another embodiment of the disclosure, where a second touchable region is switched to implementing a first function.
Figure 8A:
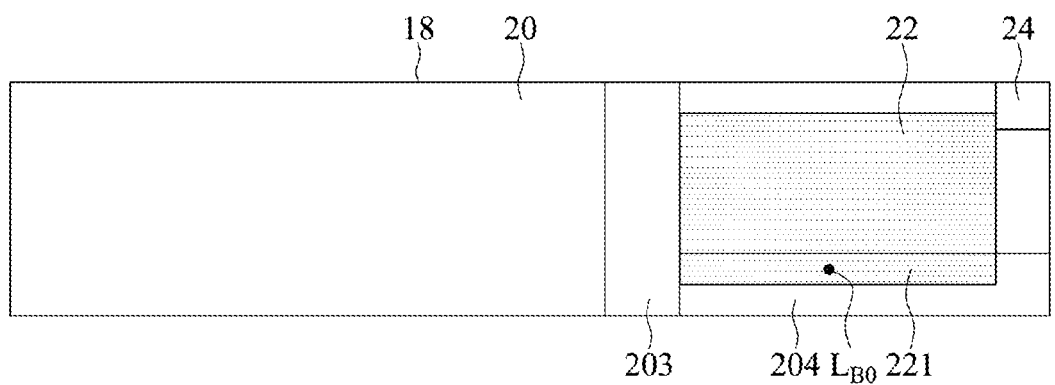
FIG. 8A is a schematic diagram of a touchable region having a palm touch point according to an embodiment of the disclosure, where a second touchable region is implementing a second function.
Figure 8B:
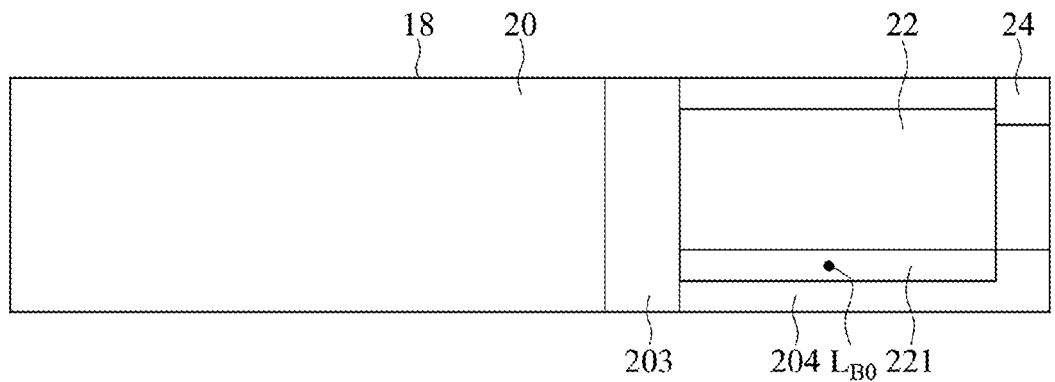
FIG. 8B is a schematic diagram of a touchable region having a palm touch point according to another embodiment of the disclosure, where a second touchable region is switched to implementing a first function.
Figure 9:
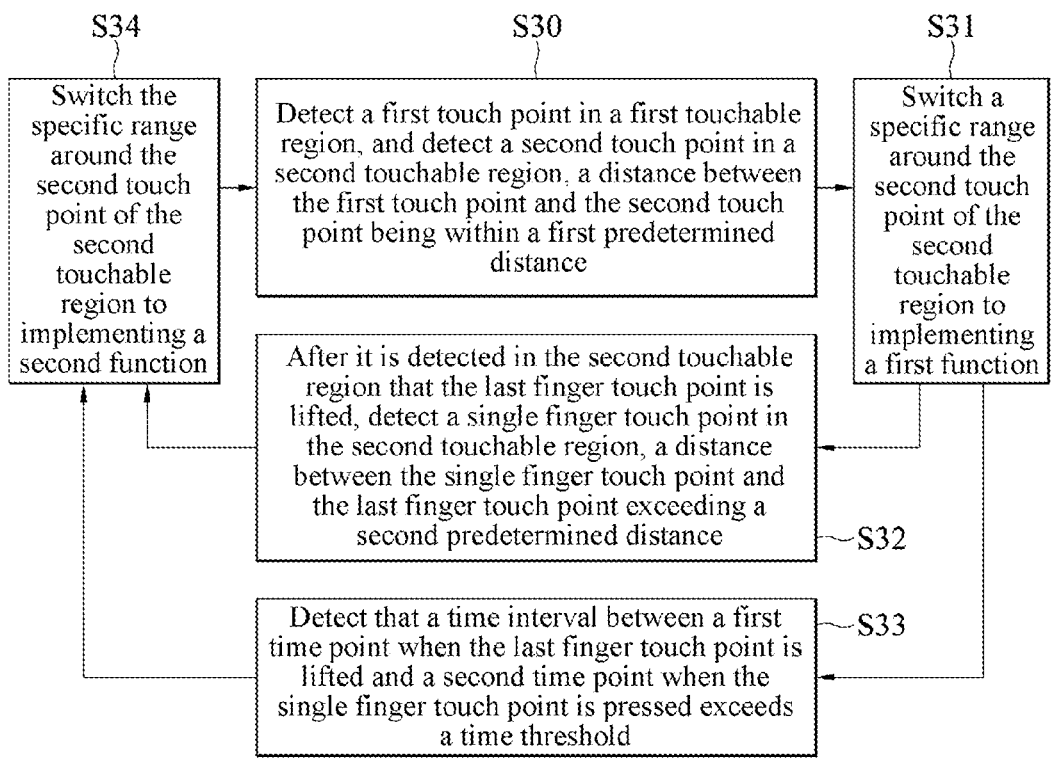
FIG. 9 is a schematic flowchart of an operation control method according to still another embodiment of the disclosure.

Referring to FIG. 4, FIG. 5A, and FIG. 5B together, the first touchable region 20 further includes a side edge region 203 adjacent to the second touchable region 22 and a first bottom edge region 204 adjacent to a bottom portion of the second touchable region 22. In addition, the second touchable region 22 further includes a second bottom edge region 221 adjacent to the first bottom edge region 204 of the first touchable region 20. Referring to FIG. 1, FIG. 2, FIG. 4, FIG. 5A and FIG. 5B together, the touch module 14 in the electronic device 10 includes the first touchable region 20 and the second touchable region 22. Under a normal mode, both the first touchable region 20 and the second touchable region 22 implement the first function. When the second touchable region 22 is enabled to implement the second function, in an embodiment, the second function of the second touchable region 22 is enabled through the third touchable region 24, the processor 16 determines an operation control method during a cross-region operation of a user. When the second touchable region 22 is implementing the second function (step S14), as shown in step S10, when a finger touch point falls onto or slides into the side edge region 203 of the first touchable region 20, at least one first touch point $P_{a0}$ is detected, and at least one second touch point $P_{b0}$ is detected in the second touchable region 22, if the processor 16 determines that a distance d between the first touch point $P_{a0}$ and the second touch point $P_{b0}$ is within a first predetermined distance, as shown in step S11, the second touchable region 22 is switched to implementing the first function, so that the second touchable region 22 is in a state of implementing the first function. If the processor 16 determines that the distance d between the first touch point $P_{a0}$ and the second touch point $P_{b0}$ is not within the first predetermined distance, the second touchable region 22 is maintained in implementing the second function. When the second touchable region 22 implements the first function (step S11), as shown in step S12, when it is detected in the second touchable region 22 that the last finger touch point is lifted, when a single finger touch point is detected in the second touchable region 22, and a distance between the single finger touch point and the last finger touch point exceeds a second predetermined distance, as shown in step S14, the second touchable region 22 is switched to implementing the second function, so that the second touchable region 22 is in a state of implementing the second function. Alternatively, as shown in step S13, the processor 16 determines that a time interval between a first time point when the last finger touch point is lifted and a second time point when the single finger touch point is pressed exceeds a time threshold, as shown in step S14, the second touchable region 22 is switched to implementing the second function.

In an embodiment, when the second touchable region 22 is enabled to implement the second function, and when the processor 16 determines an operation control method during a cross-region operation of a user, a plurality of first touch points $P_{a0}$ is detected in the side edge region 203 of the first touchable region 20 at the same time. In addition, when a plurality of second touch points $P_{b0}$ is detected in the second touchable region 22 at the same time, and the processor 16 determines that the distance d between the first touch point $P_{a0}$ and the second touch point $P_{b0}$ is within the first predetermined distance, similarly, as shown in step S11, the second touchable region 22 is switched to the state of implementing the first function. If the second touchable region 22 is temporarily switched back to implementing the first function, similarly, as described above, the second touchable region 22 can be switched to implementing the second function again as shown in step S14 provided that conditions of step S12 and step S13 are met.

Therefore, as shown in FIG. 4, step S11 and step S14 indicate states of the second touchable region 22, and steps S10, S12, and S13 are conditions for function switching.

In an embodiment, the $a^{th}$ finger touch point falls onto or moves into the side edge region 203 in the first touchable region 20 as the first touch point $P_{a0}$. The $b^{th}$ finger touch point is in the second touchable region 22 as the second touch point $P_{b0}$. In addition, a distance between the first touch point $P_{a0}$ and the second touch point $P_{b0}$ is within a first predetermined distance $Th_1$, that is, $|P_{b0}-P_{a0}| \le Th_1$. In this embodiment, the first predetermined distance $Th_1$ is 4 cm. That is, when the distance d the first touch point $P_{a0}$ and the second touch point $P_{b0}$ is less than or equal to the first predetermined distance $Th_1$, it is considered that the user is using the first function, and the second touchable region 22 is switched to implementing the first function. When the second touchable region 22 is implementing the first function, the last finger touch point $P_{c0}$ in the second touchable region 22 is lifted, and a single finger touch point $P_{d1}$ is pressed in the second touchable region 22 with a single finger, the single finger touch point $P_{d1}$ is not within a range of a second predetermined distance $Th_2$ of the last finger touch point $P_{c0}$, that is, $|P_{c0}-P_{d1}| > Th_2$. In this embodiment, the second predetermined distance $Th_2$ is 2 cm. That is, a distance between the last finger touch point $P_{c0}$ and the single finger touch point $P_{d1}$ exceeds the second predetermined distance $Th_2$. Alternatively, when the second touchable region 22 is implementing the first function, a timestamp at which the last finger touch point $P_{c0}$ of the second touchable region 22 is lifted is recorded as a first time point Tao, and a timestamp at which the single finger touch point $P_{d1}$ is pressed in the second touchable region 22 with a single finger is recorded as a second time point $T_{d1}$. In addition, a time interval between the first time point Tao and the second time point $T_{d1}$ exceeds a time threshold $Th_3$, that is, $|T_{c0}-T_{d1}| \ge Th_3$. That is, a time between the two touch points, the first time point $T_{c0}$ and the second time point $T_{d1}$, exceeds the time threshold $Th_3$. In an embodiment, the time threshold $Th_3$ is 0.35 s. Therefore, when determining that one of the conditions of step S12 and step S13 is met, the processor 16 switches the second touchable region 22 from implementing the first function to implementing the second function.

Referring to FIG. 1, FIG. 2, FIG. 6, FIG. 7A and FIG. 7B together, on the touch module 14 in the electronic device 10, the processor 16 determines, according to a parameter 22 such as a position of a finger touch point, a finger area, or whether there is a palm touch point in the first touchable region 20 and the second touchable region, that a gesture or a behavior of the user has an extremely low probability of operating the second function of the second touchable region 22, and switches the second touchable region 22 to implementing the first function. When the second touchable region 22 is implementing the first function, and the first touchable region 20 and the second touchable region 22 return to normal, in an embodiment, the finger or palm is lifted, there is no finger touch point or palm touch point, and the processor 16 determines that the gesture or behavior of the user is released, and switches the second touchable region 22 back from implementing the first function to implementing the second function.

Referring to FIG. 1, FIG. 2, FIG. 6, FIG. 7A and FIG. 7B together, when the second touchable region 22 is implementing the second function (step S25), as shown in step S20, when a finger falls onto or slides into the first bottom edge region 204 of the first touchable region 20, at least any finger touch point $P_{A0}$ is detected. It is determined that a palm of the user leans on the touch module 14, and it is difficult to implement the second function. Therefore, as shown in step S22, the processor 16 switches the second touchable region 22 to implementing the first function, so that the second touchable region 22 is in the state of implementing the first function. When the second touchable region 22 is implementing the first function (step S22), as shown in step S23, there is no finger touch point in the first bottom edge region 204, and as shown in step S24, there is no palm touch point in the second bottom edge region 221, step S25 is performed. The processor 16 switches the second touchable region 22 to implementing the second function, so that the second touchable region 22 is in the state of implementing the second function. Therefore, when determining that conditions of both step S23 and step S24 are met, the processor 16 switches the second touchable region 22 from implementing the first function to implementing the second function.

Referring to FIG. 1, FIG. 2, FIG. 6, FIG. 8A and FIG. 8B together, when the second touchable region 22 is implementing the second function (step S25), as shown in step S21, if a palm falls onto or slides into the second bottom edge region 221 of the second touchable region 22, at least any palm touch point $L_{B0}$ is detected. It is determined that the palm of the user leans on a lower half portion on the touch module 14, and it is difficult to implement the second function. Therefore, as shown in step S22, the processor 16 switches the second touchable region 22 to implementing the first function. When the second touchable region 22 is implementing the first function (step S22), as shown in step S23, there is no finger touch point in the first bottom edge region 204, and as shown in step S24, there is no palm touch point in the second bottom edge region 221, step S25 is performed. The processor 16 switches the second touchable region 22 to implementing the second function. Therefore, when determining that the conditions of both step S23 and step S24 are met, the processor 16 switches the second touchable region 22 from implementing the first function to implementing the second function.

Figure 10A:
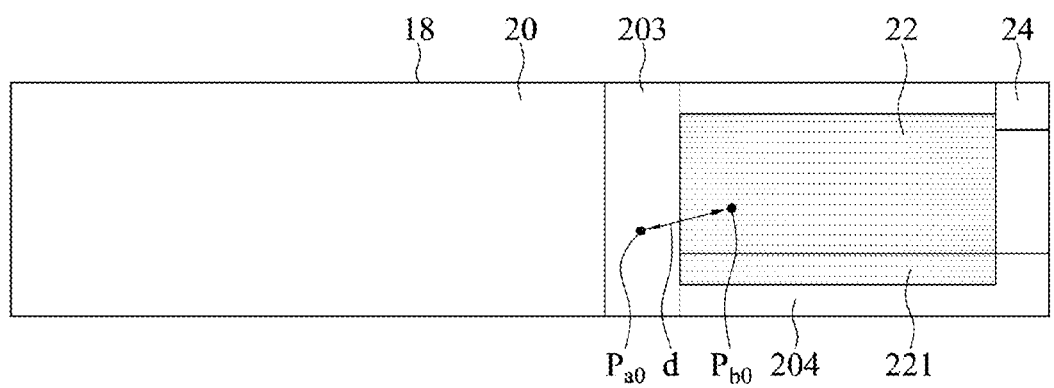
FIG. 10A is a schematic diagram of a touchable region having two finger touch points according to an embodiment of the disclosure, where a second touchable region is entirely implementing a second function.
Figure 10B:
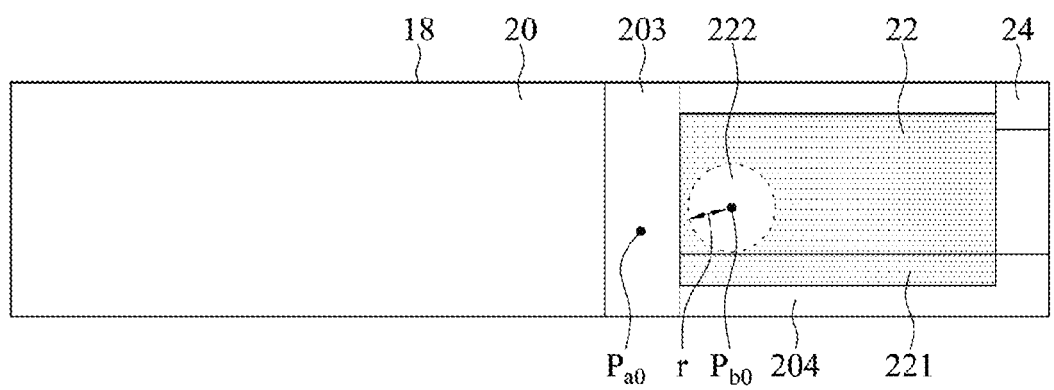
FIG. 10B is a schematic diagram of a touchable region having two finger touch points according to another embodiment of the disclosure, where a specific range around a second touch point in a second touchable region is switched to implementing a first function.
Figure 10C:
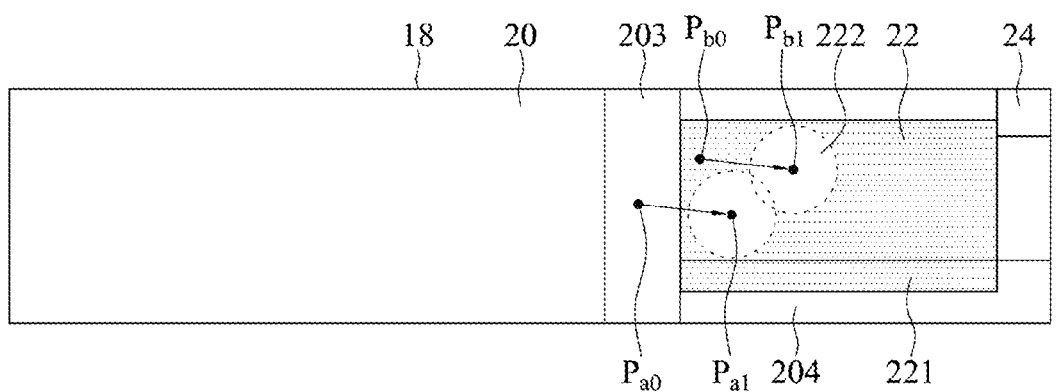
FIG. 10C is a schematic diagram of a touchable region having two finger touch points according to still another embodiment of the disclosure, where a specific range around a second touch point in a second touchable region moves as the finger touch point moves.
Figure 10D:
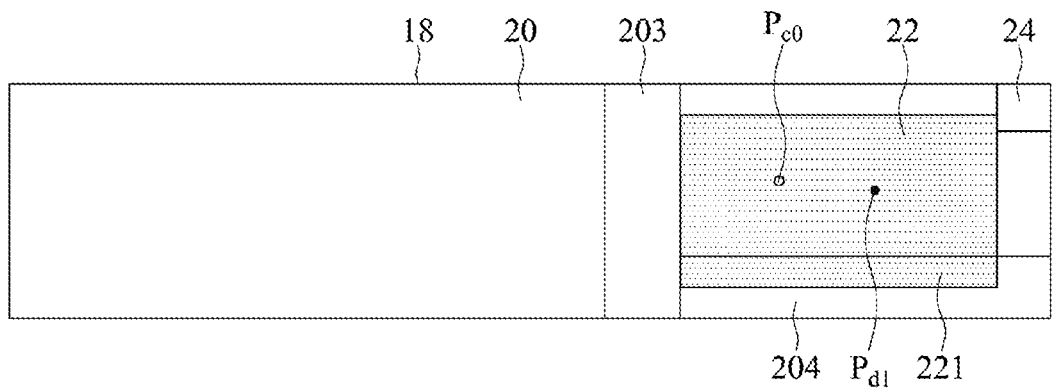
FIG. 10D is a schematic diagram of a touchable region having the last finger touch point and a single finger touch point according to an embodiment of the disclosure.

During function switching of the second touchable region 22, instead of switching a function of the entire region, only a function of a specific range around the finger touch point is switched. The other range maintains an original function. Referring to FIG. 1, FIG. 2, FIG. 9, FIG. 10A, FIG. 10B, FIG. 10C, and FIG. 10D together, when the second touchable region 22 is implementing the second function (step S34), as shown in step S30, when a finger touch point falls onto or slides into the side edge region 203 of the first touchable region 20, at least one first touch point $P_{a0}$ is detected, and at least one second touch point $P_{b0}$ is detected in the second touchable region 22, if the processor 16 determines that the distance d between the first touch point $P_{a0}$ and the second touch point $P_{b0}$ is within the first predetermined distance, as shown in step S31, a specific range 222 around the second touch point $P_{b0}$ in the second touchable region 22 is switched to implementing the first function, so that the specific range 222 around a specific second touch point $P_{b0}$ in the second touchable region 22 is in the state of implementing the first function. If the processor 16 determines that the distance d between the first touch point $P_{a0}$ and the second touch point $P_{b0}$ is not within the first predetermined distance, the entire second touchable region 22 is maintained in implementing the second function. The specific range 222 moves as the touch point falling onto or sliding into the second touchable region 22 moves. When the second touch point $P_{b0}$ slides to a second touch point $P_{b1}$, the specific range 222 moves to the second touch point PH with the second touch point $P_{b0}$. When the first touch point $P_{a0}$ located in the first touchable region 20 slides to the second touchable region 22 to become a first touch point $P_{a1}$, a specific range 222 of the first touch point $P_{a1}$ is also switched to implementing the first function. When the specific range 222 around the second touch point $P_{b0}$ is implementing the first function (step S31), as shown in step S32, when it is detected in the second touchable region 22 that the last finger touch point $P_{c0}$ is lifted (the last finger touch point $P_{c0}$ shown in FIG. 10D is a touch point when lifting indicated by using a hollow dot), if the second touchable region 22 detects a single finger touch point $P_{d1}$, and a distance between the single finger touch point $P_{d1}$ and the last finger touch point $P_{c0}$ exceeds the second predetermined distance, as shown in step S34, the specific range 222 around the second touch point $P_{b0}$ is switched back from implementing the first function to implementing the second function. Alternatively, as shown in step S33, if the processor 16 determines that a time interval between a first time point when the last finger touch point $P_{c0}$ is lifted and a second time point when the single finger touch point $P_{d1}$ is pressed exceeds a time threshold, as shown in step S34, the specific range 222 around the second touch point $P_{b0}$ in the second touchable region 22 is switched to implementing the second function, so that the specific range 222 around the specific second touch point $P_{b0}$ in the second touchable region 22 is in the state of implementing the second function.

In an embodiment, the $a^{th}$ finger touch point falls onto or moves into the side edge region 203 in the first touchable region 20 as the first touch point $P_{a0}$. The $b^{th}$ finger touch point is in the second touchable region 22 as the second touch point $P_{b0}$. In addition, a distance between the first touch point $P_{a0}$ and the second touch point $P_{b0}$ is within the first predetermined distance $Th_1$, that is, $|P_{b0}-P_{a0}| \le Th_1$, indicating that the distance between the first touch point $P_{a0}$ and the second touch point $P_{b0}$ is less than or equal to the first predetermined distance $Th_1$. The user is regarded as using the first function. The specific range 222 around the second touch point $P_{b0}$ in the second touchable region 22 is switched to implementing the first function. In an embodiment, the specific range 222 is within a radius r of the second touch point $P_{b0}$. The radius r is 3 cm. When the specific range 222 around the second touch point $P_{b0}$ is implementing the first function, as shown in FIG. 10D, when the last finger touch point $P_{c0}$ in the second touchable region 22 is lifted, and the single finger touch point $P_{d1}$ is pressed in the second touchable region 22 with a single finger, the single finger touch point $P_{d1}$ is not within the range of the second predetermined distance $Th_2$ of the last finger touch point $P_{c0}$, that is, $|P_{c0}-P_{d1}| > Th_2$, indicating that the distance between the last finger touch point $P_{c0}$ and the single finger touch point $P_{d1}$ exceeds the second predetermined distance $Th_2$. Alternatively, when the specific range 222 around the second touch point $P_{b0}$ is implementing the first function, the timestamp at which the last finger touch point $P_{c0}$ of the second touchable region 22 is lifted is recorded as the first time point $T_{c0}$, and the timestamp at which the single finger touch point $P_{d1}$ is pressed in the second touchable region 22 with a single finger is recorded as the second time point $T_{d1}$. In addition, the time interval between the first time point $T_{c0}$ and the second time point $T_{d1}$ exceeds the time threshold $Th_3$, that is, $|T_{c0}-T_{d1}| \ge Th_3$, indicating the time between the two touch points, the first time point $T_{c0}$ and the second time point $T_{d1}$, exceeds the time threshold $Th_3$. Therefore, when determining that one of conditions of step S32 and step S33 is met, the processor 16 switches the specific range 222 around the second touch point $P_{b0}$ in the second touchable region 22 from implementing the first function to implementing the second function. In addition, the specific range 222 moves as the finger touch point moves. As shown in FIG. 10C, the finger touch point moves from an original first touch point $P_{a0}$ to a position of a new first touch point $P_{a1}$. Since the new first touch point $P_{a1}$ moves into the second touchable region 22, the specific range 222 around the new first touch point $P_{a1}$ is switched to implementing the first function. In addition, the finger touch point moves from an original second touch point $P_{b0}$ to a position of a new second touch point $P_{b1}$, the specific range 222 is moved and changed from being around the original second touch point $P_{b0}$ into a specific range 222 around the new second touch point $P_{b1}$.

Figure 11:
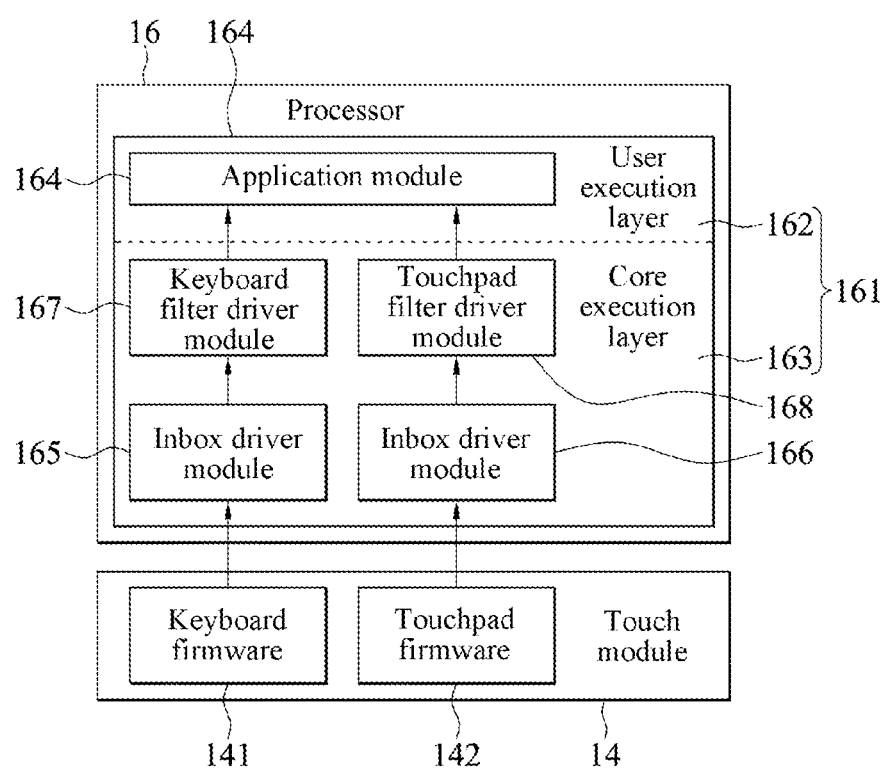
FIG. 11 is a schematic diagram of a system architecture of a processor of an electronic device according to an embodiment of the disclosure.

Based on the foregoing electronic device 10, the disclosure further describes a basic architecture of an internal operating system 161 executing the touch algorithm from the perspective of a system architecture of the processor 16 of the electronic device 10. Referring to FIG. 1, FIG. 2, and FIG. 11 together, the operating system 161 of the processor 16 includes a user execution layer 162 and a core execution layer 163. An application module 164 is run on the user execution layer 162. Inbox driver modules 165 and 166, a keyboard filter driver module 167, and a touchpad filter driver module 168 are run on the core execution layer 163. The touch module 14 includes keyboard firmware 141 and touchpad firmware 142, respectively signal-connected to the corresponding inbox driver modules 165 and 166. In an embodiment, the touchpad filter driver module 168 implements the first function and is responsible for communicating the touchpad firmware 142 and the application module 164. The keyboard filter driver module 167 implements the second function and is responsible for communicating the keyboard firmware 141 and the application module 164. In addition, the touch algorithm is implemented on the touchpad filter driver module 168. When the first touchable region 20 or the second touchable region 22 of the touch module 14 senses the finger touch point, the touchpad firmware 142 correspondingly generates touch information. The touch information is transmitted to the touchpad filter driver module 168 via the inbox driver module 166, for communication with the application module 164 through the touchpad filter driver module 168. Similarly, when the second touchable region 22 of the touch module 14 senses the finger touch point, the touchpad firmware 142 correspondingly generates touch information. The touch information is transmitted to the touchpad filter driver module 168 via the inbox driver module, 166 and is transmitted to the keyboard filter driver module 167 via the touchpad filter driver module 168, for communication with the application module 164 through the keyboard filter driver module 167.

In the foregoing embodiments, the touch algorithm is implemented on the touchpad filter driver module 168. In another embodiment, the touch algorithm is alternatively implemented on another software element, such as the application module 164, the inbox driver modules 165 and 166, the keyboard filter driver module 167, the touchpad firmware 142, or the keyboard firmware 141 as shown in FIG. 11.

In an embodiment, the touch information includes at least coordinate information, time information, and state information of the touch point.

In conclusion, the disclosure provides an electronic device and an operation control method, to improve user experience of a combined touch module, and provide a mode for determining a gesture of a user, to allow a user to smoothly control and use a first function (such as a touchpad function) or/and a second function (such as a keyboard function) on an ultra-large touch module.

The foregoing embodiments are merely used to describe technical ideas and features of the disclosure, which are intended to enable a person familiar with the technology to understand and implement contents of the disclosure, but do not limit claims of the disclosure. All equivalent changes or modifications without departing from the spirit revealed in the disclosure should still fall within the claims of the disclosure.

What is claimed is:

1. An electronic device, comprising:
a touch module, comprising a touchable region, wherein the touchable region is divided into at least a first touchable region and a second touchable region, the first touchable region is configured to implement a first function, and the second touchable region is configured to implement the first function and a second function; and
a processor, electrically connected to the touch module, wherein when at least one first touch point is detected in the first touchable region, at least one second touch point is detected in the second touchable region, and the processor determines that a distance between the first touch point and the second touch point is within a first predetermined distance, the second touchable region is switched to implementing the first function;
wherein the processor switches the second touchable region from implementing the first function to implementing the second function if one of the following conditions is met, the conditions comprising:
when it is detected in the second touchable region that the last finger touch point is lifted, when a single finger touch point is detected in the second touchable region, a distance between the single finger touch point and the last finger touch point exceeds a second predetermined distance; and
a time interval between a first time point when the last finger touch point is lifted and a second time point when the single finger touch point is pressed exceeds a time threshold.

2. The electronic device according to claim 1, wherein the first touchable region further comprises a side edge region adjacent to the second touchable region and a first bottom edge region adjacent to a bottom portion of the second touchable region, and the second touchable region further comprises a second bottom edge region adjacent to the first bottom edge region.

3. The electronic device according to claim 2, wherein the first touch point is detected in the side edge region.

4. The electronic device according to claim 2, wherein when a finger touch point is detected in the first bottom edge region or a palm touch point is detected in the second bottom edge region, the processor switches the second touchable region to implementing the first function.

5. The electronic device according to claim 4, wherein when the finger touch point is not in the first bottom edge region, or the palm touch point is not in the second bottom edge region, the second touchable region is switched back to implementing the second function.

6. The electronic device according to claim 1, wherein the processor switches a specific range around the second touch point in the second touchable region to implementing the first function.

7. The electronic device according to claim 6, wherein the processor switches the specific range around the second touch point from implementing the first function to implementing the second function if one of the following conditions is met, the conditions comprising:
when it is detected in the second touchable region that the last finger touch point is lifted, when a single finger touch point is detected in the second touchable region, a distance between the single finger touch point and the last finger touch point exceeds a second predetermined distance; and a time interval between a first time point when the last finger touch point is lifted and a second time point when the single finger touch point is pressed exceeds a time threshold.

8. The electronic device according to claim 1, wherein the first touchable region further comprises a lower edge region located on a lower edge, wherein when a starting touch point and a current-frame touch point are detected in the lower edge region, and a distance between the starting touch point and the current-frame touch point is less than or equal to a predetermined distance threshold, the processor determines that the current-frame touch point is an untrusted touch point and skips performing triggering, and when the starting touch point and the current-frame touch point are detected in the lower edge region, and the distance between the starting touch point and the current-frame touch point is greater than the predetermined distance threshold, the processor determines that the current-frame touch point is a trusted touch point and triggers gesture control to implement the first function.

9. The electronic device according to claim 1, wherein the first touchable region further comprises an upper edge region located on an upper edge, wherein when a palm touch point and a current-frame touch point are detected in the upper edge region, and a distance between the palm touch point and the current-frame touch point is less than or equal to a predetermined distance threshold, the processor determines that the current-frame touch point is an untrusted touch point and skips performing triggering, and when the palm touch point and the current-frame touch point are detected in the lower edge region, and the distance between the current-frame touch point and the palm touch point is greater than the predetermined distance threshold, the processor determines that the current-frame touch point is a trusted touch point and triggers gesture control to implement the first function.

10. The electronic device according to claim 1, wherein the touchable region further comprises a third touchable region located in a corner and configured to enable or disable the second function of the second touchable region.

11. An operation control method, applicable to a touch module of an electronic device, wherein the touch module comprises a touchable region, the touchable region is divided into at least a first touchable region and a second touchable region, the first touchable region is configured to implement a first function, and the second touchable region is configured to implement the first function and a second function, the operation control method comprising:
detecting at least one first touch point in the first touchable region;
detecting at least one second touch point in the second touchable region; and
switching the second touchable region to the first function when it is determined that a distance between the first touch point and the second touch point is within a first predetermined distance;
wherein the first touchable region further comprises a side edge region adjacent to the second touchable region and a first bottom edge region adjacent to a bottom portion of the second touchable region, and the second touchable region further comprises a second bottom edge region adjacent to the first bottom edge region.

12. The operation control method according to claim 11, wherein the second touchable region is further switched from implementing the first function to implementing the second function if one of the following conditions is met, the conditions comprising:

when it is detected in the second touchable region that the last finger touch point is lifted, when a single finger touch point is detected in the second touchable region, a distance between the single finger touch point and the last finger touch point exceeds a second predetermined distance; and
a time interval between a first time point when the last finger touch point is lifted and a second time point when the single finger touch point is pressed exceeds a time threshold.

13. The operation control method according to claim 11, wherein the first touch point is detected in the side edge region.

14. The operation control method according to 11, wherein when a finger touch point is detected in the first bottom edge region, or a palm touch point is detected in the second bottom edge region, the second touchable region is switched to implementing the first function.

15. The operation control method according to claim 14, wherein when the finger touch point is not in the first bottom edge region, or the palm touch point is not in the second bottom edge region, the second touchable region is switched back to implementing the second function.

16. The operation control method according to claim 11, wherein the switching the second touchable region to implementing the first function further comprises switching a specific range around the second touch point in the second touchable region to implementing the first function.

17. The operation control method according to claim 16, wherein the specific range around the second touch point is switched from implementing the first function to implementing the second function if one of the following conditions is met, the conditions comprising:
when it is detected in the second touchable region that the last finger touch point is lifted, when a single finger touch point is detected in the second touchable region, a distance between the single finger touch point and the last finger touch point exceeds a second predetermined distance; and
a time interval between a first time point when the last finger touch point is lifted and a second time point when the single finger touch point is pressed exceeds a time threshold.

18. The operation control method according to claim 11, wherein the first touchable region further comprises a lower edge region located on a lower edge, and the operation control method further comprises: determining, when a starting touch point and a current-frame touch point are detected in the lower edge region, and a distance between the starting touch point and the current-frame touch point is less than or equal to a predetermined distance threshold, that the current-frame touch point is an untrusted touch point and skipping performing triggering, and when the starting touch point and the current-frame touch point are detected in the lower edge region, and the distance between the starting touch point and the current-frame touch point is greater than the predetermined distance threshold, determining that the current-frame touch point is a trusted touch point and triggering gesture control to implement the first function.

19. The operation control method according to claim 11, wherein the first touchable region further comprises an upper edge region located on an upper edge, and the operation control method further comprises: when a palm touch point and a current-frame touch point are detected in the upper edge region, and a distance between the palm touch point and the current-frame touch point is less than or equal to a predetermined distance threshold, determining that the current-frame touch point is an untrusted touch point and skipping performing triggering, and when the palm touch point and the current-frame touch point are detected in the lower edge region, and the distance between the current-frame touch point and the palm touch point is greater than the predetermined distance threshold, determining that the current-frame touch point is a trusted touch point and triggering gesture control to implement the first function.

20. An electronic device, comprising:
  a touch module, comprising a touchable region, wherein the touchable region is divided into at least a first touchable region and a second touchable region, the first touchable region is configured to implement a first function, and the second touchable region is configured to implement the first function and a second function; and
  a processor, electrically connected to the touch module, wherein when at least one first touch point is detected in the first touchable region, at least one second touch point is detected in the second touchable region, and the processor determines that a distance between the first touch point and the second touch point is within a first predetermined distance, the second touchable region is switched to implementing the first function;
  wherein the processor switches a specific range around the second touch point in the second touchable region to implementing the first function.

* * * * *